(12) United States Patent
Holbrook

(10) Patent No.: US 7,406,968 B1
(45) Date of Patent: Aug. 5, 2008

(54) FAIL SAFE INTERLOCK METHOD AND APPARATUS

(76) Inventor: Kevin M. Holbrook, 23517 Cedar Ridge Rd., Rapidan, VA (US) 22733

(*) Notice: Subject to any disclaimer, the term of this patent is extended or adjusted under 35 U.S.C. 154(b) by 24 days.

(21) Appl. No.: 11/701,488

(22) Filed: Feb. 2, 2007

(51) Int. Cl.
*A61B 19/00* (2006.01)

(52) U.S. Cl. ...................................... 128/897

(58) Field of Classification Search ............ 250/453.11, 250/505.1, 517.1, 526, 398, 492.1, 492.3, 250/336.1; 378/162, 165, 166, 204, 210; 70/262, 263, 264; 52/1; 340/540, 542, 573.1, 340/573, 600, 635, 5.1, 5.2; 128/897, 898; 600/1–8
See application file for complete search history.

(56) References Cited

U.S. PATENT DOCUMENTS

| 3,948,067 | A | * | 4/1976 | Peterson | ....................... 70/263 |
| 5,137,312 | A | * | 8/1992 | Tang | ....................... 292/336.3 |
| 6,973,758 | B2 | * | 12/2005 | Zeik et al. | ....................... 52/561 |

* cited by examiner

*Primary Examiner*—Samuel G Gilbert

(57) ABSTRACT

The present invention relates to a fail safe method and apparatus for automatically securing an area during a medical radiation procedure. Upon initiation of the procedure, an electrical signal is sent from the medical device to the locking device, which automatically secures all passages to and from the radiation room. Upon completion of the procedure, a second signal automatically is sent from the medical device thereby opening the locking device and allowing free passage to and from the room.

8 Claims, 1 Drawing Sheet

FAIL SAFE INTERLOCK METHOD AND APPARATUS

FIELD OF INVENTION

At the present time hospitals display an illuminated sign or other warning indicator during the radiation procedure to alert personnel of the procedure in progress and not to enter the room. As an added precaution, the doors to the room are sometimes manually locked at this time. However, there are times when the doors are not locked and are accidentally opened during the procedure. When this occurs, there is interruption of the radiation procedure and loss of time and money. The procedure must be restarted and the radiation images are sometimes lost, adding lost time and additional expense for hospitals, their personnel and patients. Also there is the further problem of accidental radiation contamination to personnel and property when the doors are mistakenly opened.

The present invention relates to a method and apparatus for automatically securing and locking all entry and exit passages to and from a radiation room during a medical radiation procedure. The present interlock system is useful for securing an area when any medical radiation procedure is in progress. These procedures include performing x-ray radiations, CAT scans and in nuclear medicine.

SUMMARY OF THE INVENTION

The present invention relates to a fail safe method and apparatus for automatically securing an area during a medical radiation procedure. Upon initiation of the procedure, an electrical signal is sent from the medical device to the locking device, which automatically secures all passages to and from the radiation room. Upon completion of the procedure, a second signal automatically is sent from the medical device thereby opening the locking device and allowing free passage to and from the room.

DETAILED DESCRIPTION OF THE INVENTION

Figure 1:
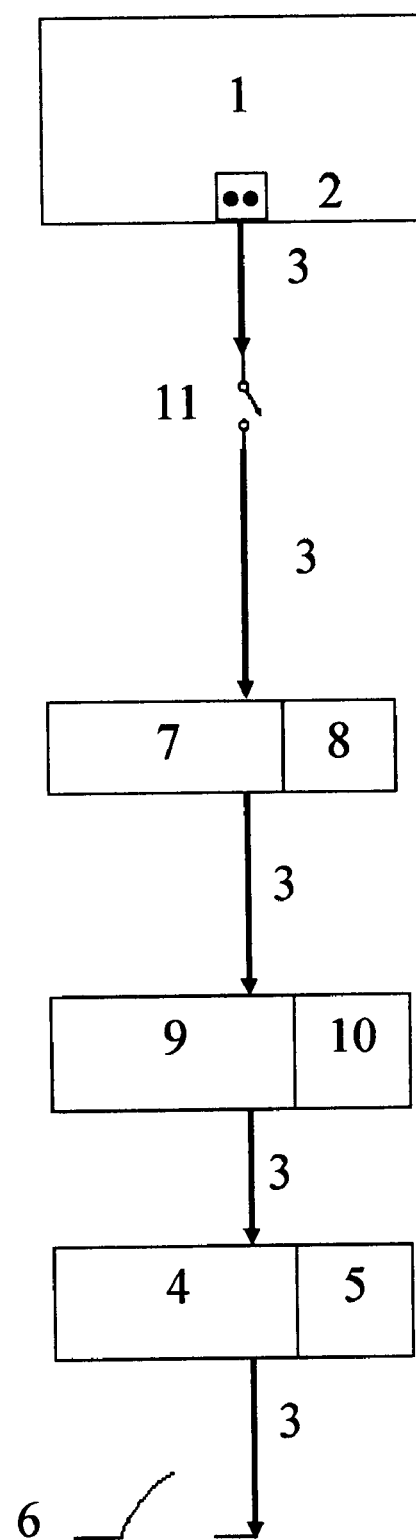
FIG. 1 is a block diagram showing a typical electrical interlock system according to the present invention.

With reference to the drawing, the block diagram of FIG. 1 illustrates one form of an electrical wiring scheme of the present invention.

Upon initiation of the medical radiation procedure, a 24 volt alternating current electrical signal from the medical radiation device (1) is provided to an electrical signal contact (2). Transmission line (3) conducts this signal to a locking device (4), which activates door magnets (5) for securing passageways (6). The door magnets in current use are electromagnetic locks purchased from the Grainger catalogue at www.grainger.com, Item # 4GD82. The transmission line typically comprises 12 gauge copper wire. Included in the transmission line is a relay device (7) containing a 24 volt transformer, which converts the signal from alternating to direct current. The relay in use is also purchased from Grainer Item # 2DT97. There is also included in the transmission line a control device (9) and contacts for inputting a 120 voltage alternating current (10) and outputting 12 volts of direct current. The control device which is currently installed by the inventor in hospitals is the Securitron Power Supply model BPS-24-2 purchased from Securitron Magnalock Corporation. Website: www.securitron.com.

The present invention also provides for an emergency "on/off" switch (11) (Telemecaniqe manufacturer from Grainger Item # 6HK78). This switch, located in the transmission line (3), is normally in the closed or "on" position and allowing the signal to pass through the circuit. When the switch is turned to the "off" or open position, the signal from the medical device is interrupted. This loss of power shuts down the medical device, deactivates the door magnets and opens the locking device.

When the radiation procedure is completed, a second signal is generated from the radiation device which shuts down the medical device and opens the locking device. The second signal is sent via transmission line (3) to the door magnets (5). In addition if there is a general lose of power to medical device, the door magnets are automatically deactivated and the locking device is opened.

The invention claimed is:

1. A method for securing all entry and exit passages to and from a radiation room during a medical radiation procedure comprising the steps of:
   providing a first electrical signal from a radiation device upon initiation of the medical procedure,
   transmitting said signal to a locking device for securing passage to and from said radiation area
   activating said locking device, and thereby securing said area.

2. The method of claim 1 further including the step of interrupting the transmission signal and deactivating said locking device in the event of an emergency.

3. The method of claim 1 further including the step of transforming said transmission signal from alternating current to direct current.

4. The method of claim 1 further including the step of providing a 120 voltage to said transmission signal.

5. The method of claim 1 further including the step of providing a second electrical signal from the radiation device upon completion of the radiation procedure to deactivate said locking device and allowing free passage to and from the radiation area.

6. The method of claim 1 wherein said secure area is a hospital radiation room.

7. An apparatus for securing all entry and exit passages to and from a radiation room during a medical radiation procedure comprising:
   an electrical signal contact (2) receiving an electrical signal from a medical radiation device (1),
   an electrically operated electromagnetic locking device (4) securing and locking all passageways (6) to and from said radiation room,
   a transmission line (3) receiving said signal from said signal contact (2) and transmitting said signal to said electrical electromagnetic locking device (4)
   said transmission line (3) including a relay device (7) having attached thereto a direct current transformer (8), and a control device (9) receiving an input voltage of 120 volts of alternating current and an outputs voltage of 12 volts direct current to said locking device.

8. The apparatus of claim 7, wherein said transmission line (3) includes a switch (11) deactivating the medical radiation device (1) and opening said locking device (4) in the event of an emergency.

* * * * *